United States Patent
Xu et al.

(10) Patent No.: US 8,604,996 B2
(45) Date of Patent: Dec. 10, 2013

(54) WIRELESS TERMINAL

(71) Applicant: Huawei Device Co., Ltd., Guangdong (CN)

(72) Inventors: Huiliang Xu, Shenzhen (CN); Shuhui Sun, Shenzhen (CN); Yao Lan, Shenzhen (CN); Dongxing Tu, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 0 days.

(21) Appl. No.: 13/714,248

(22) Filed: Dec. 13, 2012

(65) Prior Publication Data

US 2013/0106669 A1    May 2, 2013

Related U.S. Application Data

(63) Continuation of application No. PCT/CN2012/080282, filed on Aug. 17, 2012.

(30) Foreign Application Priority Data

Aug. 31, 2011  (CN) .......................... 2011 1 0255653

(51) Int. Cl.
*H01Q 1/52* (2006.01)
*H01Q 1/24* (2006.01)

(52) U.S. Cl.
USPC ...................... 343/841; 343/702; 455/575.5

(58) Field of Classification Search
USPC .......... 343/702, 841; 455/575.1, 575.5, 575.7
See application file for complete search history.

(56) References Cited

U.S. PATENT DOCUMENTS 6,768,460 B2 *   7/2004   Hoashi et al. .......... 343/700 MS
7,151,955 B2 *  12/2006   Huber et al. ............... 455/575.5
(Continued)

FOREIGN PATENT DOCUMENTS

CN    1601656 A    3/2005
CN  101800786 A    8/2010
(Continued)

OTHER PUBLICATIONS

International Search Report and Written Opinion of the International Searching Authority in Corresponding International Patent Application No. PCT/CN2012/080282 (Nov. 22, 2012).

(Continued)

*Primary Examiner* — Michael C Wimer
*Assistant Examiner* — Hasan Islam
(74) *Attorney, Agent, or Firm* — Leydig, Voit & Mayer, Ltd.

(57) ABSTRACT

An embodiment of the present invention discloses a wireless terminal. The wireless terminal according to the embodiment of the present invention includes a PCB primary board, a primary board circuit printed on both sides of the PCB primary board, and a diversity antenna, where the diversity antenna is disposed at an end of the PCB primary board, a first primary board metal shielding cover and a second primary board metal shielding cover are each disposed on the primary board circuit on the both sides of the PCB primary board, a radiator is printed on at least one side panel of the PCB primary board, the radiator and the primary board circuit are located in different areas of the PCB primary board, and a first wave absorbing sheet is attached to the first primary board metal shielding cover and/or the second primary board metal shielding cover.

8 Claims, 2 Drawing Sheets

(56) References Cited

U.S. PATENT DOCUMENTS

| | | | |
|---|---|---|---|
| 7,432,867 B2* | 10/2008 | Wang et al. | 343/702 |
| 7,750,147 B2 | 7/2010 | Vonwiller et al. | |
| 7,764,236 B2* | 7/2010 | Hill et al. | 343/702 |
| 8,214,003 B2* | 7/2012 | Wong et al. | 455/575.5 |
| 2007/0273602 A1 | 11/2007 | Zhu et al. | |
| 2009/0052142 A1 | 2/2009 | Brewer et al. | |

FOREIGN PATENT DOCUMENTS

| | | |
|---|---|---|
| CN | 201590990 U | 9/2010 |
| CN | 201796088 U | 4/2011 |
| CN | 102045992 A | 5/2011 |
| CN | 102098070 A | 6/2011 |
| CN | 102157778 A | 8/2011 |
| CN | 102158246 A | 8/2011 |
| CN | 102324626 A | 1/2012 |
| CN | 101867385 A | 1/2013 |
| EP | 1220458 A2 | 7/2002 |
| EP | 2552028 A1 | 1/2013 |
| KR | 20010008238 A | 2/2001 |

OTHER PUBLICATIONS

1$^{st}$ Office Action in corresponding Chinese Patent Application No. 201110255653.0 (Apr. 1, 2013).

2$^{nd}$ Office Action in corresponding Chinese Patent Application No. 201110255653.0 (Sep. 6, 2013).

Extended European Search Report in corresponding European Patent Application No. 12798584.4 (Aug. 29, 2013).

\* cited by examiner

WIRELESS TERMINAL

CROSS-REFERENCE TO RELATED APPLICATIONS

This application is a continuation of International Patent Application No. PCT/CN2012/080282, filed Aug. 17, 2012, which claims priority to Chinese Patent Application No. 201110255653.0, filed on Aug. 31, 2011, both of which are incorporated herein by reference in their entireties.

FIELD OF THE INVENTION

The present invention relates to the field of communications, and in particular, to a wireless terminal.

BACKGROUND OF THE INVENTION

A specific absorption rate (Specific Absorption Rate, referred to as SAR) refers to a ratio at which electromagnetic wave energy of a wireless communications terminal is absorbed. It is usually used as an indicator to measure intensity of electromagnetic radiation when the wireless communications terminal approaches a body: A greater SAR value indicates a greater impact on the human body; contrarily, the impact is smaller. The SAR has become one of the contents marked on a product package or a product manual by terminal vendors in many countries and regions.

As more and more wireless communications devices such as a mobile phone, a data card, a tablet PC and so on, enter people's life, people gradually become aware that electromagnetic radiation generated by such communications devices has many negative effects on health of the body when they enjoy a variety of conveniences brought by the wireless communications devices. For example, too much electromagnetic radiation causes functional disorder of a central nervous system of a person, and brings symptoms such as a headache, insomnia and so on. At present, an excess of standard of the SAR value of a wireless terminal has become a big problem in the industry. The SAR value of the wireless terminal is relevant to a test distance (a distance between a radiator and a human body model) and transmit power, that is, in a case that the transmit power is the same, the smaller the test distance is, the greater the SAR value is. Therefore, to solve the foregoing problem, the wireless terminal vendors usually adopt the following solutions: reducing the transmit power of the wireless terminal; and increasing a thickness of the overall terminal (indirectly increasing the test distance).

However, apparently, wireless radiation power (Total Radiation Power, referred to as TRP) is decreased when the transmit power of the wireless terminal is reduced, thereby reducing wireless performance of the wireless terminal. Increasing the thickness of the overall terminal may affect use experience of a user, while a tendency of the wireless terminal is to be compact, ultra-thin, and portable; therefore, apparently, increasing the thickness of the overall terminal cannot be accepted by the user.

SUMMARY OF THE INVENTION

A technical problem to be solved in embodiments of the present invention is to provide a wireless terminal, so as to effectively decrease a SAR value under a premise of not affecting wireless performance of the wireless terminal and use experience of a user, thereby reducing an impact of electromagnetic radiation on a human body.

In order to solve the foregoing technical problem, an embodiment of the present invention adopts the following technical solution:

A wireless terminal includes a PCB primary board, a primary board circuit printed on both sides of the PCB primary board, and a diversity antenna, where the diversity antenna is disposed at an end of the PCB primary board, a first primary board metal shielding cover and a second primary board metal shielding cover are each disposed on the primary board circuit on the both sides of the PCB primary board, a radiator is printed on at least one side panel of the PCB primary board, where the radiator and the primary board circuit are located in different areas of the PCB primary board, the radiator contacts neither the first primary board metal shielding cover nor the second primary board metal shielding cover, and a first wave absorbing sheet is attached to the first primary board metal shielding cover and/or the second primary board metal shielding cover.

By attaching the first wave absorbing sheet to the first primary board metal shielding cover and/or the second primary board metal shielding cover, the wireless terminal according to the embodiments of the present invention can effectively decreasing the SAR value under the premise of not affecting the wireless performance of the wireless terminal and the use experience of the user, thereby reducing the impact of the electromagnetic radiation on the human body.

BRIEF DESCRIPTION OF THE DRAWINGS

To illustrate the technical solutions in the embodiments of the present invention or in the prior art more clearly, the following briefly describes the accompanying drawings needed for describing the embodiments. Apparently, the accompanying drawings in the following description are merely some embodiments of the present invention, and persons of ordinary skill in the art may obtain other accompanying drawings from these accompanying drawings without making creative efforts.

DESCRIPTION OF MARKS IN ACCOMPANYING DRAWINGS

Figure 1:
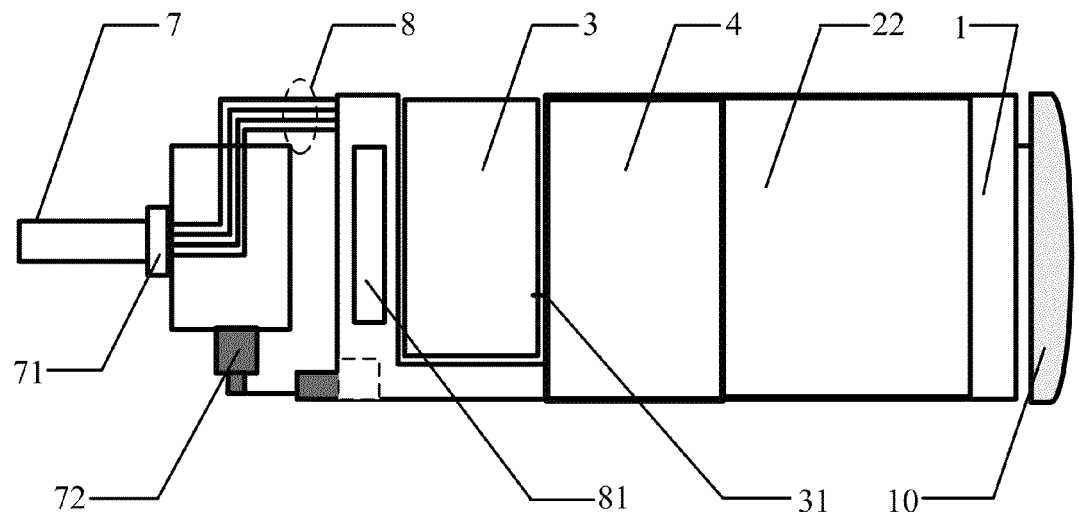
FIG. 1 is a front view of a wireless terminal according to an embodiment of the present invention.

1. PCB primary board 21. First primary board metal shielding cover 22. Second primary board metal shielding cover 3. Radiator 31. Feed-point 41. First wave absorbing sheet 42. Second wave absorbing sheet 43. Third wave absorbing sheet 44. Fourth wave absorbing sheet 5. PCB secondary board 6. Secondary board metal shielding cover 7. USB head 71. First rotation axis 72. Second rotation axis 8. USB cable 81. USB cable soldering pad 9. Metal sheet 10. Diversity antenna

DETAILED DESCRIPTION OF THE EMBODIMENTS

An embodiment of the present invention provides a wireless terminal, which can effectively decreasing a SAR value under a premise of not affecting wireless performance of the wireless terminal.

The following describes the embodiment of the present invention in detail with reference to the accompanying drawings.

Figure 2:
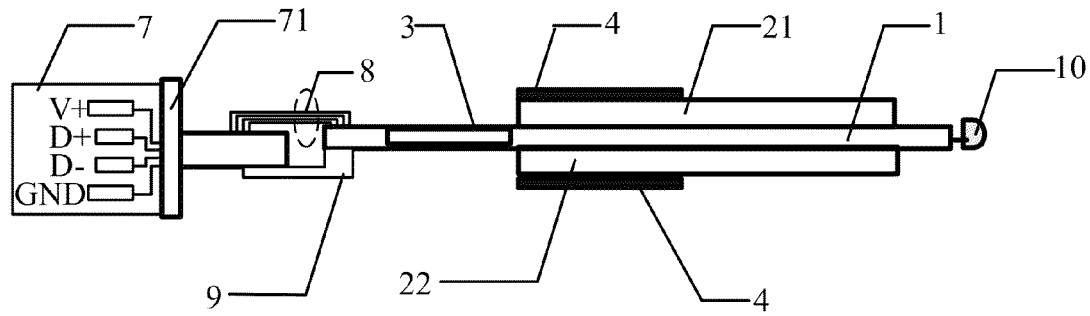
FIG. 2 is a top view of a wireless terminal according to an embodiment of the present invention.

As shown in FIG. 1 and FIG. 2, a wireless terminal provided in this embodiment includes a PCB primary board 1, a primary board circuit printed on both sides of the PCB primary board 1, and a diversity antenna 10, where the diversity antenna 10 is disposed at an end of the PCB primary board 1. Furthermore, the primary board circuit in the present invention may be also disposed only on one side panel of the PCB primary board 1 according to a practical need.

A first primary board metal shielding cover 21 and a second primary board metal shielding cover 22 are each disposed at the primary board circuit on the both sides of the PCB primary board 1. The function of the first primary board metal shielding cover 21 and the second primary board metal shielding cover 22 is to protect the primary board circuit covered in the metal shielding covers against electromagnetic interference outside. A radiator 3 is further printed on at least one side panel of the PCB primary board 1, where the radiator 3 may be printed on only one side panel of the PCB primary board 1, or printed at two side panels of the PCB primary board 1, according to a practical need. The radiator 3 and the primary board circuit are located in different areas of the PCB primary board 1, that is, the radiator 3 and the primary board circuit do not have an overlapped area on the PCB primary board 1. The radiator 3 and the first primary board metal shielding cover 21 do not contact each other, and the radiator 3 and the second primary board metal shielding cover 22 also do not contact each other. Further, a distance between an edge position of the first primary board metal shielding cover 21 and the second primary board metal shielding cover 22, where the edge position is close to the radiator 3, and the radiator 3 is optimally from 0.5 mm to 1.0 mm.

To reduce electromagnetic radiation of the radiator 3, a first wave absorbing sheet 41 is attached to the first primary board metal shielding cover 21 and/or the second primary board metal shielding cover 22 in this embodiment, that is, a first wave absorbing sheet 41 is attached to at least one side panel of the PCB primary board 1. Whether to attach one first wave absorbing sheet or to attach two first wave absorbing sheets may be reasonably selected according to actual a practical condition, an indicator requirement and so on. The wave absorbing sheet in this embodiment refers to a sheet shaped object which has a certain thickness and is manufactured by a wave absorbing material.

The radiator 3 is usually divided into a radiation field and an induction field, and energy generated by the radiation field and the induction field are called far-field energy and near-field energy, respectively. The near-field energy is the main energy which does harm to a human body. A research shows that the near-field energy of the radiator 3 is distributed near a feed-point 31 in a centralized manner as shown in FIG. 1, and extends to the areas of the first primary board metal shielding cover 21 and the second primary board metal shielding cover 22. When the wave absorbing sheet absorbs the near-field energy, it almost does not affect the far-field energy. Therefore, when it is ensured that radiation power of the radiator 3 is unchanged, to absorb the near-filed energy as much as possible, the first wave absorbing sheet 41 is attached to the first primary board metal shielding cover 21 and/or the second primary board metal shielding cover 22 in this embodiment, so as to absorb the near-field energy.

Further, as shown in FIG. 2, to better absorb the near-field energy of the radiator 3, the first wave absorbing sheet 41 is attached to an edge of one end of the first primary board metal shielding cover and/or the second primary board metal shielding cover, where the end is close to the radiator. In this way, the first wave absorbing sheet can absorb the near-field energy to the greatest extent.

Figure 3:
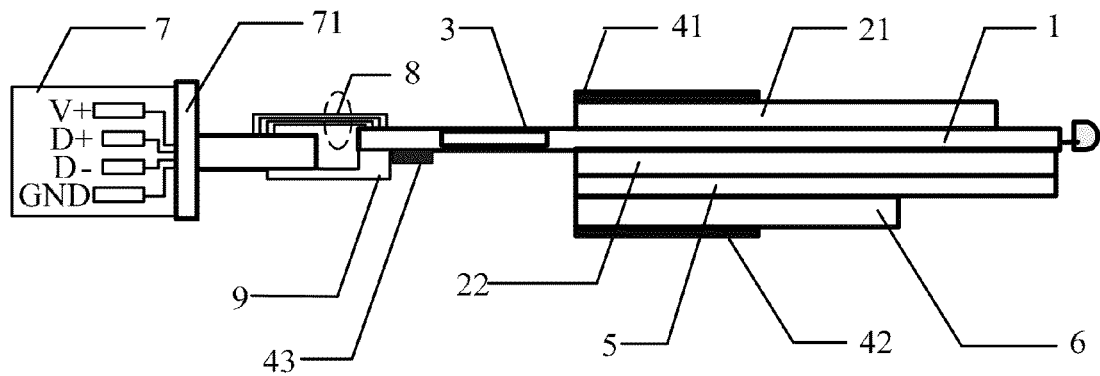
FIG. 3 is a first top view of a wireless terminal with a PCB secondary board according to an embodiment of the present invention.

As shown in FIG. 3, the wireless terminal provided in this embodiment further includes a PCB secondary board 5 at an outside of the first primary board metal shielding cover 21 or the second primary board metal shielding cover 22, that is, the first primary board metal shielding cover 21 or the second primary board metal shielding cover 22 is disposed between the PCB primary board 1 and the PCB secondary board 5. In a circuit design, when the space of the PCB primary board 1 is not enough for deploying a needed electronic component, a PCB secondary board 5 may be added to ensure integrity of the circuit. The PCB secondary board 5 is connected to the PCB primary board 1 through a connector, where the connector may be a BTB (Board To Board) connector. A secondary board circuit is printed at one side which is of the PCB secondary board 5 and is away from the first primary board metal shielding cover 21 or the second primary board metal shielding cover 22, a secondary board metal shielding cover 6 is disposed on the secondary board circuit, where a function of the secondary board metal shielding cover 6 is also to protect the secondary circuit covered inside against electromagnetic interference outside. A second wave absorbing sheet 42 is attached to the secondary board metal shielding cover 6. Further, to better absorb the near-field energy, the second wave absorbing sheet 42 is attached to an edge of one end of the secondary board metal shielding cover 6, where the end is close to the radiator 3.

The wireless terminal provided in this embodiment further includes a USB head 7, where the USB head 7 is connected to the PCB primary board 1 through a USB cable 8 and a metal sheet 9, and the USB cable 8 includes a pair of signal lines and a pair of power lines. To facilitate use of a user, as an embodiment of the present invention, the USB head 7 is a 2D rotation structure and includes a first rotation axis 71 and a second rotation axis 72, where the first rotation axis 71 is disposed between the USB head 7 and the USB cable 8, the second rotation axis 72 is disposed between the metal sheet 9 and the PCB primary board 1. In this way, the USB head 7 may rotate by 180 degrees relative to the PCB primary board 1, which greatly facilitates the use of the user.

The USB cable 8 is connected to the PCB primary board 1 through a USB cable soldering pad 81 on the PCB primary board 1, that is, the USB cable 8 is welded on the USB cable soldering pad 81 on the PCB primary board 1. To further absorb the near-field energy, a third wave absorbing sheet 43 may further be attached to the USB cable soldering pad 81.

Figure 4:
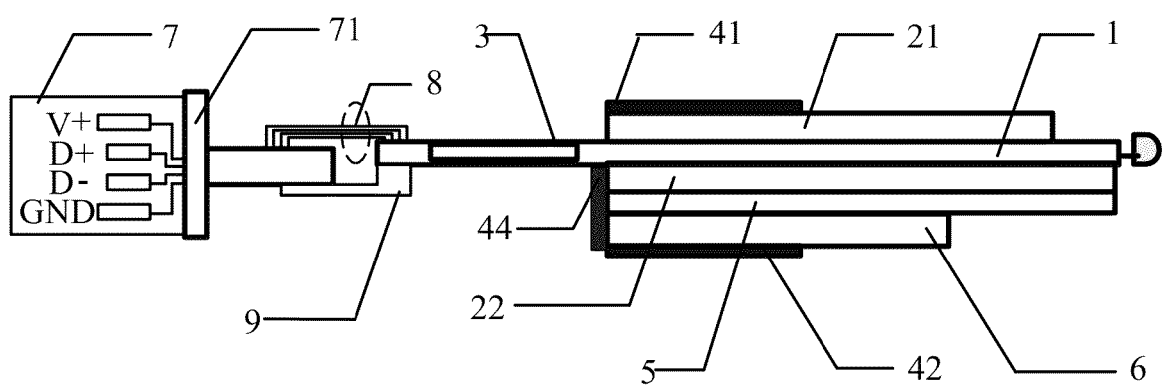
FIG. 4 is a second top view of a wireless terminal with a PCB secondary board according to an embodiment of the present invention.

Further, as shown in FIG. 4, a fourth wave absorbing sheet 44 may further be attached to a side edge of the second primary board metal shielding cover 22 and the secondary board metal shielding cover 6 to further absorb the near-field energy. In addition, a wave absorbing sheet may also be attached to a side edge of the first primary board metal shielding cover 21.

In addition, a position of the wave absorbing sheet in this embodiment are not limited to the foregoing four positions, and the wave absorbing sheet may be attached in any position around the radiator 3 except being directly attached to the radiator 3.

As proved by a great many experiments, after the wave absorbing sheet is attached according to the foregoing method, a SAR value of the wireless terminal effectively decreases in a case that the radiation power basically remains unchanged.

By attaching the first wave absorbing sheet to the first primary board metal shielding cover and/or the second primary board metal shielding cover, the wireless terminal according to this embodiment can effectively decreasing the SAR value under a premise of not affecting wireless performance of the wireless terminal and use experience of the user, thereby reducing an impact of electromagnetic radiation on the human body. Further, in this embodiment, the first wave absorbing sheet is further attached to the edge of the end of the first primary board metal shielding cover and/or the second primary board metal shielding cover, where the end is close to the radiator, so as to achieve the best absorbing efficiency of the wave absorbing sheet.

Through the foregoing description of the embodiment, persons skilled in the art may clearly understand that the present invention may be accomplished by software plus necessary universal hardware, and definitely may also be accomplished by hardware, but in many cases, the former is preferred. Based on such understanding, the technical solutions of the present invention essentially, or the part contributing to the prior art may be embodied in a form of a software product. The computer software product is stored in a readable storage medium, such as a floppy disk, a hard disk, or a compact disk and so on of the computer, and includes several instructions for instructing a computer device (which may be a personal computer, a server, a network device, and the like) to execute the methods described in the embodiment of the present invention.

The foregoing descriptions are merely exemplary embodiments of the present invention, but not intended to limit the protection scope of the present invention. Any variation or replacement that is readily conceivable to persons skilled in the art without departing from the technical scope of the present invention shall fall within the protection scope of the present invention. Therefore, the protection scope of the present invention shall be subject to the protection scope of the appended claims.

The invention claimed is:

1. A wireless terminal, comprising a PCB primary board, a primary board circuit printed on both sides of the PCB primary board, and a diversity antenna, wherein the diversity antenna is disposed at an end of the PCB primary board, a first primary board metal shielding cover and a second primary board shielding cover are each disposed on the primary board circuit on the both sides of the PCB primary board, a radiator is printed on at least one side panel of the PCB primary board the radiator and the primary board circuit are located in different areas of the PCB primary board, the radiator contacts neither the first primary board metal shielding cover nor the second primary board metal shielding cover, and a first wave absorbing sheet is attached to at least one of the first primary board metal shielding cover and the second primary board metal shielding cover;
wherein the wireless terminal further comprises a PCB secondary board disposed at an outside of the first primary board metal shielding cover or the second primary board metal shielding cover, the PCB secondary board is connected to the PCB primary board through a connector, a secondary board circuit is printed on a side which is of the PCB secondary board and is away from the first primary board metal shielding cover or the second primary board metal shielding cover, a secondary board metal shielding cover is disposed on the secondary board circuit, and a second wave absorbing sheet is disposed on the secondary board metal shielding cover.

2. The wireless terminal according to claim 1, wherein the second wave absorbing sheet is attached to an edge of one end of the secondary board metal shielding cover, where the end is close to the radiator.

3. The wireless terminal according to claim 1, wherein a third wave absorbing sheet is attached to disposed on a side edge of the second primary board metal shielding cover and the secondary board metal shielding cover.

4. The wireless terminal according to claim 1, wherein the first wave absorbing sheet is attached to an edge of one end of at least one of the first primary board metal shielding cover and the second primary board metal shielding cover, where the end is close to the radiator.

5. The wireless terminal according to claim 1, wherein a distance between the edge of the first primary board metal shielding cover and the second primary board metal shielding cover, where the edge is close to the radiator, and the radiator is from 0.5 mm to 1.0 mm.

6. A wireless terminal, comprising a PCB primary board, a primary board circuit printed on both sides of the PCB primary board, and a diversity antenna, wherein the diversity antenna is disposed at an end of the PCB primary board, a first primary board metal shielding cover and a second primary board shielding cover are each disposed on the primary board circuit on the both sides of the PCB primary board, a radiator is printed on at least one side panel of the PCB primary board, the radiator and the primary board circuit are located in different areas of the PCB primary board, the radiator contacts neither the first primary board metal shielding cover nor the second primary board metal shielding cover, and a first wave absorbing sheet is attached to at least one of the first primary board metal shielding cover and the second primary board metal shielding cover;
wherein the wireless terminal further comprises a USB head and the USB head is connected to the PCB primary board through a USB cable and a metal sheet;
wherein the USB cable is connected to the PCB primary board through a USB cable soldering pad on the PCB primary board, and a second wave absorbing sheet is attached to the USB cable soldering pad.

7. The wireless terminal according to claim 6, wherein the USB cable comprises a pair of signal lines and a pair of power lines.

8. A wireless terminal, comprising a PCB primary board, a primary board circuit printed on both sides of the PCB primary board, and a diversity antenna, wherein the diversity antenna is disposed at an end of the PCB primary board, a first primary board metal shielding cover and a second primary board shielding cover are each disposed on the primary board circuit on the both sides of the PCB primary board, a radiator is printed on at least one side panel of the PCB primary board, the radiator and the primary board circuit are located in different areas of the PCB primary board, the radiator contacts neither the first primary board metal shielding cover nor the second primary board metal shielding cover, and a first wave absorbing sheet is attached to at least one of the first primary board metal shielding cover and the second primary board metal shielding cover;
wherein a second wave absorbing sheet is attached to a side edge of the second primary board metal shielding cover and the secondary board metal shielding cover.

* * * * *

UNITED STATES PATENT AND TRADEMARK OFFICE
CERTIFICATE OF CORRECTION

| | | |
|---|---|---|
| PATENT NO. | : 8,604,996 B2 | Page 1 of 1 |
| APPLICATION NO. | : 13/714248 | |
| DATED | : December 10, 2013 | |
| INVENTOR(S) | : Xu et al. | |

It is certified that error appears in the above-identified patent and that said Letters Patent is hereby corrected as shown below:

Title page, item (71) Applicant's City of Residence "Guangdong (CN)" should read -- Shenzhen (CN) --.

Signed and Sealed this
First Day of April, 2014

Michelle K. Lee
*Deputy Director of the United States Patent and Trademark Office*